Patented Sept. 12, 1950

2,522,393

UNITED STATES PATENT OFFICE 2,522,393

ALLYL ESTERS OF AMINOARYLCARBOXYLIC ACIDS

Charles R. Milone, Cuyahoga Falls, Ohio, assignor to Wingfoot Corporation, Akron, Ohio, a corporation of Delaware No Drawing. Application July 26, 1947, Serial No. 764,021

3 Claims. (Cl. 260—471)

This invention relates to the polyesters of the type resulting from the reaction of an allyl ester of an aminoarylcarboxylic acid and an allyl haloformate, the polyester having the general formula

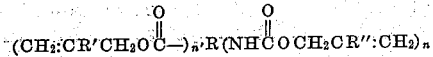

where R is a polyvalent aromatic hydrocarbon radical, $n$ and $n'$ are whole numbers not greater than 2, and R' and R" are hydrogen, chlorine or methyl.

It has been discovered that a new composition of matter may be produced when the allyl ester of an aminoarylcarboxylic acid is reacted with an allyl haloformate, which new composition is characterized by its ability to be polymerized to a resinous mass of hard, clear, glass-like properties.

As an example of this invention, 100 parts of allyl chloroformate was added to a solution of 97 parts of allyl anthranilate in 150 parts of pyridine at 10° C. When the reaction was completed, the reaction mixture was poured into an excess of dilute hydrochloric acid and the resulting organic layer separated, washed and dried. Distillation of the organic layer yielded 118 parts, an 80% yield, of allyl N-carballoxy anthranilate, B. P. 165–7° C./2 mm., $$d_{15}^{29}\ 1.1456$$

and $n_D^{28}$ 1.5410.

A quantity of this diester was heated for 43 hours at 65° C. in the presence of 5% benzoyl peroxide as a catalyst to produce a resinous mass characterized as being a hard, clear, glass-like resin.

The reaction as exemplified above may be expressed by means of the following general equation:

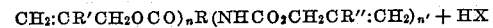

where R' and R" are hydrogen, chlorine or methyl, where R is a polyvalent aromatic hydrocarbon radical, where X is a halogen and where $n$ and $n'$ are whole numbers not greater than 2. The hydrogen attached to the nitrogen may be substituted by an alkyl monovalent radical.

The reaction of the amino group with the haloformate may be carried out at an elevated temperature, for example, the reflux temperature of the haloformate with or without an inert solvent. It is preferred to carry out the reaction of the amino group with the haloformate in the presence of an acceptor for the hydrogen-halide which is formed during the course of the reaction. When an acceptor is used, lower temperatures, for example 0 to 75° C., may be employed and are preferred.

As acceptors that may be used are those basic materials that are either organic or inorganic in nature, such as, for example, pyridine, piperidine, dimethyl aniline and the hydroxides and carbonates of the alkali and alkaline earth metals. It is preferred to carry out the reaction in the absence of water, although water may be present, but when present usually results in a lower yield due to the hydrolysis of the haloformate and of the desired end product.

In the example shown above, allyl anthranilate was used as an example of an allyl ester of an aminoarylcarboxylic acid as a starting material to be reacted with an allyl haloformate. However, any polyallyl ester of any aminoarylcarboxylic acid may be used. A diallyl ester of an aryl polyaminocarboxylic acid may be used. Also, a polyallyl ester of polyaminoarylcarboxylic acid may be used. These aminoarylcarboxylic acids may be represented by the following structural formula: $(HOCO)_nR(NH_2)_{n'}$, in which R is a polyvalent aromatic hydrocarbon radical and $n$ and $n'$ are whole numbers having a value of 1 or 2.

An example of an aminoarylcarboxylic acid containing one amino group and one carboxyl group is anthranilic acid. An example of an aminoarylcarboxylic acid containing two amino groups and one carboxyl group is diaminobenzoic acid. An example of an aminoarylcarboxylic acid containing three amino groups and one carboxyl group is 2,4,6-triamino benzoic acid. Examples of an aminoarylcarboxylic acid containing one amino group and two carboxyl groups are 4-amino-1,3-benzene dicarboxylic acid and 3-amino phthalic acid. An example of an aminoarylcarboxylic acid containing two amino groups and two carboxyl groups is 4,6-diamino naphthalic acid. The esters of these acids are made by reacting allyl alcohol with the acid in the presence of an esterifying agent, i. e., $H_2SO_4$ and heat, i. e., 0–100° C. and recovering the ester.

The reaction involving the starting materials of this invention may be carried out at a temperature between about 0° C. and the reflux temperature of the haloformate being used. The starting materials may be present in equal molar proportions where one amino group is present. Where more than one amino group is present, a corresponding increase in the molar amount of the formate is to be used where a reaction is desired with each of the amino groups. Generally the reaction takes place on each of the amino groups where more than one is present directly in accordance with the molar equivalent of the formate present. Thus, where two amino groups are present and one molar equivalent of formate is used, the end product generally contains an unreacted amino group.

The aminoaryl polyesters of this invention show outstanding properties in their ability to polymerize to a hard, clear, glass-like mass having a Rockwell hardness of M 100 or more and a specific gravity of 1.2 or more. The polyesters of this invention are particularly useful as cross-linking agents when added to and polymerized with other polymerizable monomeric compositions, and particularly the mono-functional polymerizable monomers such as styrene, acrylic acid, the acrylates, acrylonitrile, the conjugated dienes having a terminal ethylenic linkage including 1,3-butadiene and vinyl compounds including vinyl chloride, vinylidene chloride, etc. The polymerization of the diesters of this invention may be carried out at a temperature ranging from about 20° C. to 100° C. for a period of time of about 10 hours to about 100 hours, depending, of course, upon the temperatures used and the presence or absence of a polymerization catalyst. It is preferred, however, to use a polymerization catalyst when carrying out the polymerization reaction. Suitable polymerization catalysts are benzoyl peroxide, hydrogen peroxide, and other oxygen-generating agents. Catalysts may be used in amount between about 1% and 10% based upon the total weight of the monomers being reacted. The copolymerization reaction is usually carried out under the same conditions as are used in carrying out the polymerization of the polyesters, or under the conditions that are ordinarily employed in carrying out the polymerization of the polymerizable monomer being reacted with the polyester.

The polymeric masses produced in accordance with the foregoing description are useful in the molding of any of the many types of articles ordinarily made from hard, clear, resinous masses.

Suitable changes may be made in the details of the process without departing from the spirit or scope of the present invention, the proper limits of which are defined in the appended claims.

I claim:

1. A compound corresponding to the following structural formula:

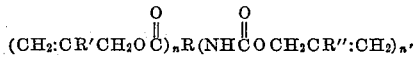

where R is a polyvalent aromatic hydrocarbon radical, where R' and R'' are selected from the group consisting of hydrogen, chlorine and methyl and $n$ and $n'$ are whole numbers not greater than 2.

2. A method of producing a compound corresponding to the following structural formula:

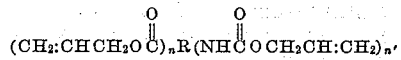

where R is a polyvalent aromatic hydrocarbon radical and $n$ and $n'$ are whole numbers not greater than 2, which comprises reacting an allyl chloroformate with an allyl ester of an aminoarylcarboxylic acid having the structural formula:

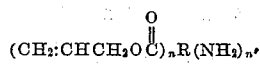

where R is a polyvalent aromatic hydrocarbon radical and $n$ and $n'$ are whole numbers not greater than 2.

3. Allyl N-carballoxy anthranilate.

CHARLES R. MILONE.

REFERENCES CITED

The following references are of record in the file of this patent:

UNITED STATES PATENTS

| Number | Name | Date |
| --- | --- | --- |
| 2,385,931 | Muskat et al. | Oct. 2, 1945 |
| 2,390,551 | Muskat et al. | Dec. 11, 1945 |
| 2,395,750 | Muskat et al. | Feb. 26, 1946 |